United States Patent [19]

Hamilton

[11] 4,006,455
[45] Feb. 1, 1977

[54] ERROR CORRECTION SYSTEM IN A PROGRAMMABLE CALCULATOR

[75] Inventor: Stephen P. Hamilton, Garland, Tex.

[73] Assignee: Texas Instruments Incorporated, Dallas, Tex.

[22] Filed: Oct. 10, 1975

[21] Appl. No.: 622,288

[52] U.S. Cl. .......................... 340/146.1 F; 360/53
[51] Int. Cl.² ........................................ G06K 5/00
[58] Field of Search ........... 340/146.1 F, 146.1 AB; 360/38, 47, 53

[56] References Cited

UNITED STATES PATENTS

| | | | |
|---|---|---|---|
| 2,929,049 | 3/1960 | Lubkin | 360/53 |
| 3,276,033 | 9/1966 | Cogar et al. | 360/53 |
| 3,417,333 | 12/1968 | Atzenbeck | 340/146.1 AB |
| 3,685,015 | 8/1972 | Bocek | 340/146.1 F |
| 3,729,708 | 4/1973 | Wolfer et al. | 340/146.1 F |
| 3,792,436 | 2/1974 | De Voy et al. | 340/146.1 F |

Primary Examiner—Charles E. Atkinson
Attorney, Agent, or Firm—Harold Levine; Rene Grossman; Stephen Sadacca

[57] ABSTRACT

An error correction system is particularly suitable for user programmable calculators which may be programmed to perform a series of functions on data entries by means of a series of program steps entered into the calculator from a storage media such as recorded magnetic cards or the like. Data is stored in one or more pairs of tracks on the recording media with the first track of each pair for storing binary zeros and a second track of each pair for storing binary ones. Each time a binary zero is present, an alternating transition negative to positive or positive to negative appears on the zero's track of the storage media and each time a one is present an alternating transition negative to positive or positive to negative appears on the one's track of the storage media. For reading the data stored on the storage media, means such as a data latch is provided for each track for storing the direction of the previous transition positive to negative or negative to positive for that track and means for comparing the direction of such previous transition with the direction of the present transition. Whenever it is determined that the state of a bit of data is missing on a pair of tracks, i.e., no transition stored on either track for a given bit, the transitions located prior to, and following said missing bit will indicate the track on which the data bit should have been stored and hence the state of the missing bit. In an embodiment in which at least two pairs of tracks are utilized, the ORed output from the first pair of tracks may be compared to the ORed output from the second pair of tracks such that whenever a bit appears for the first pair but not the second pair it is determined that a bit is missing for the second pair.

10 Claims, 35 Drawing Figures

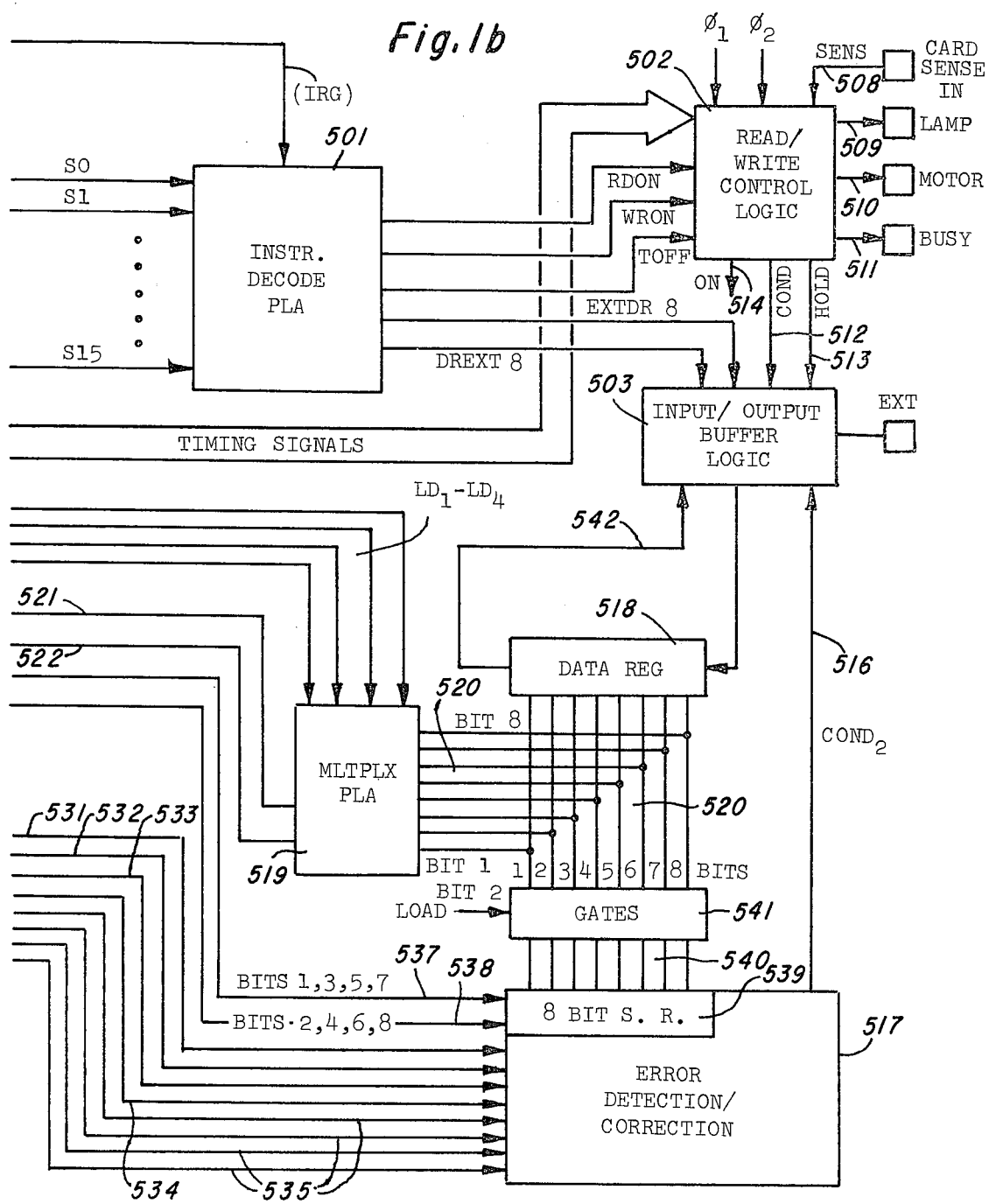

| Fig. 2a | Fig. 2b | Fig. 2c | Fig. 2d | Fig. 2e |
|---------|---------|---------|---------|---------|
| Fig. 2f | Fig. 2g | Fig. 2h | Fig. 2i | Fig. 2j |

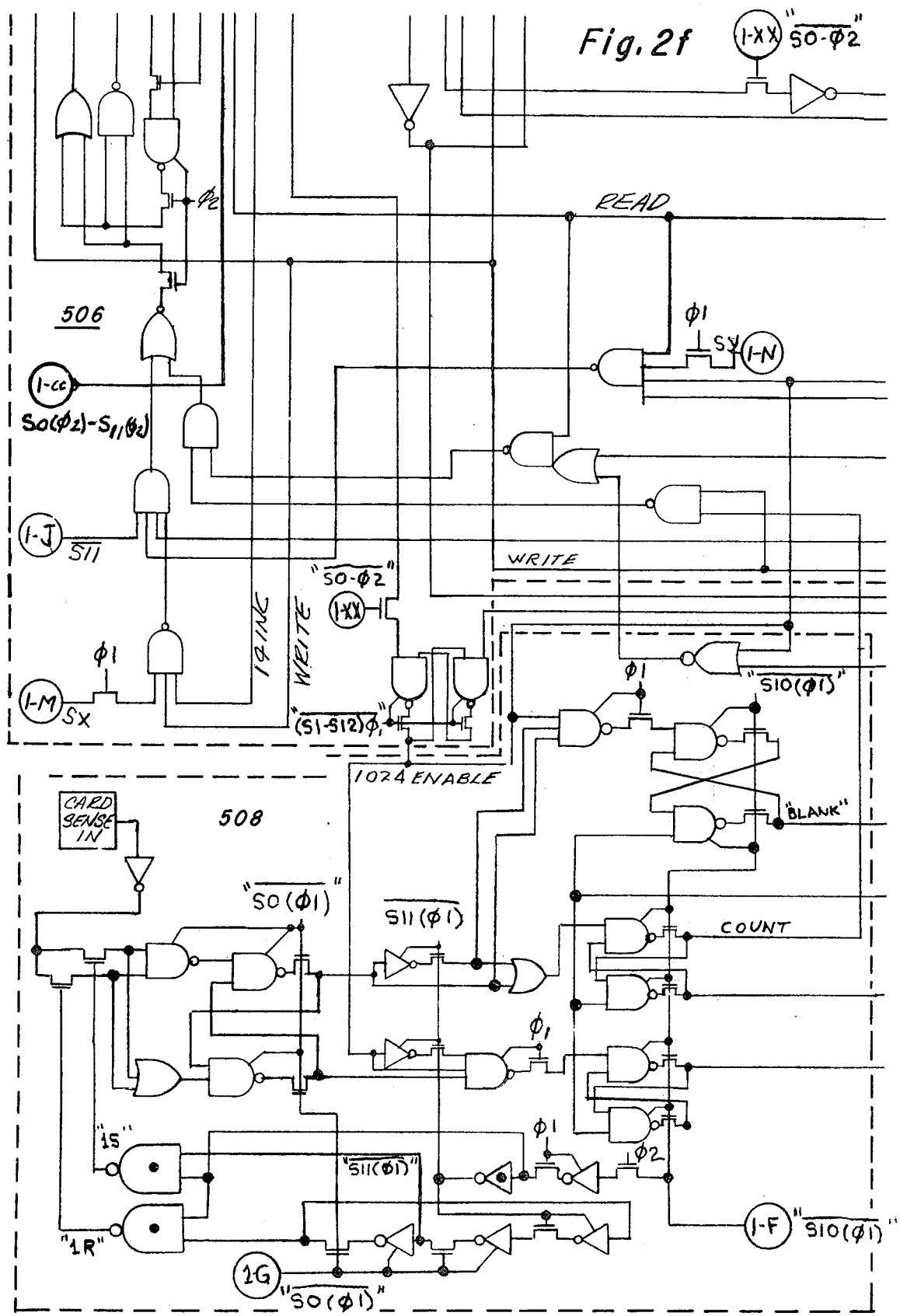

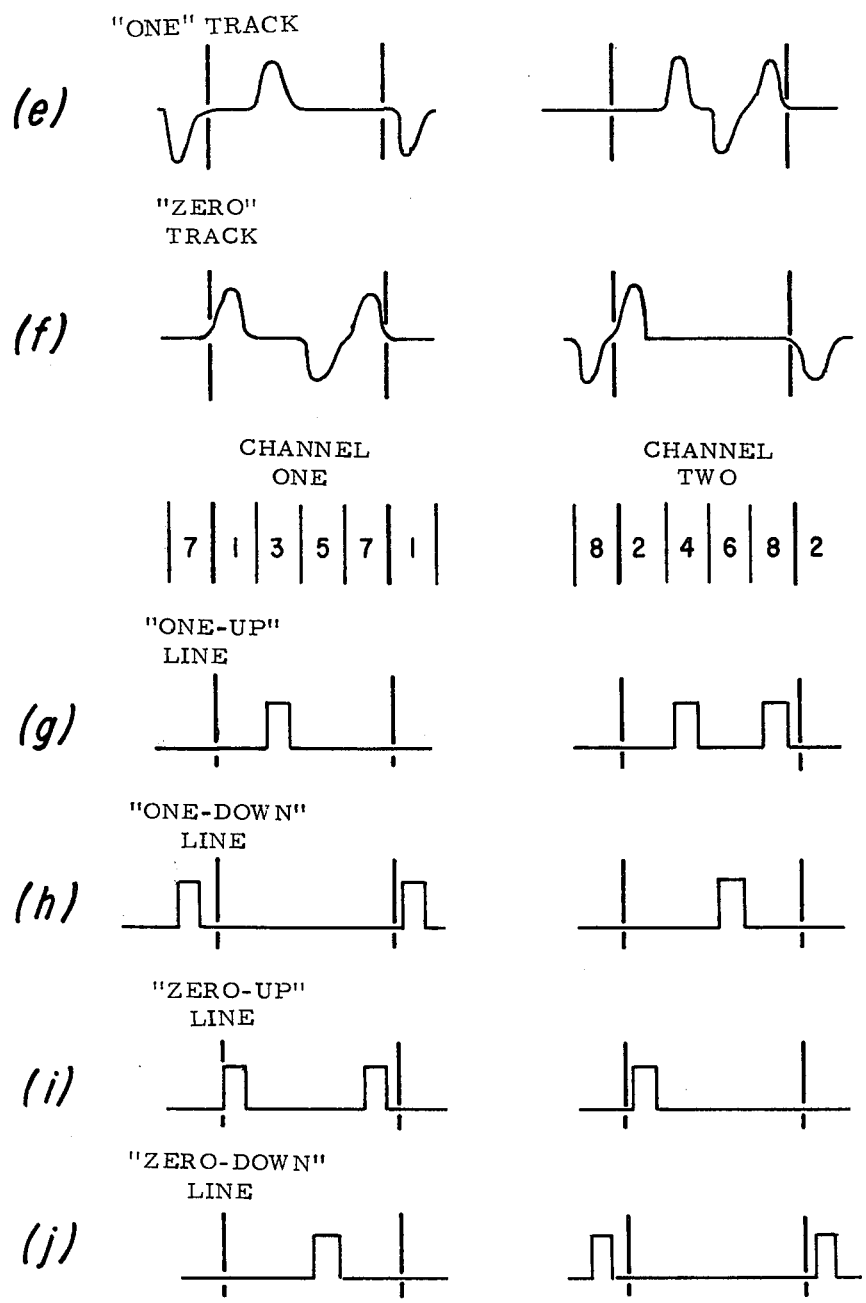
Fig. 4 (con't.)

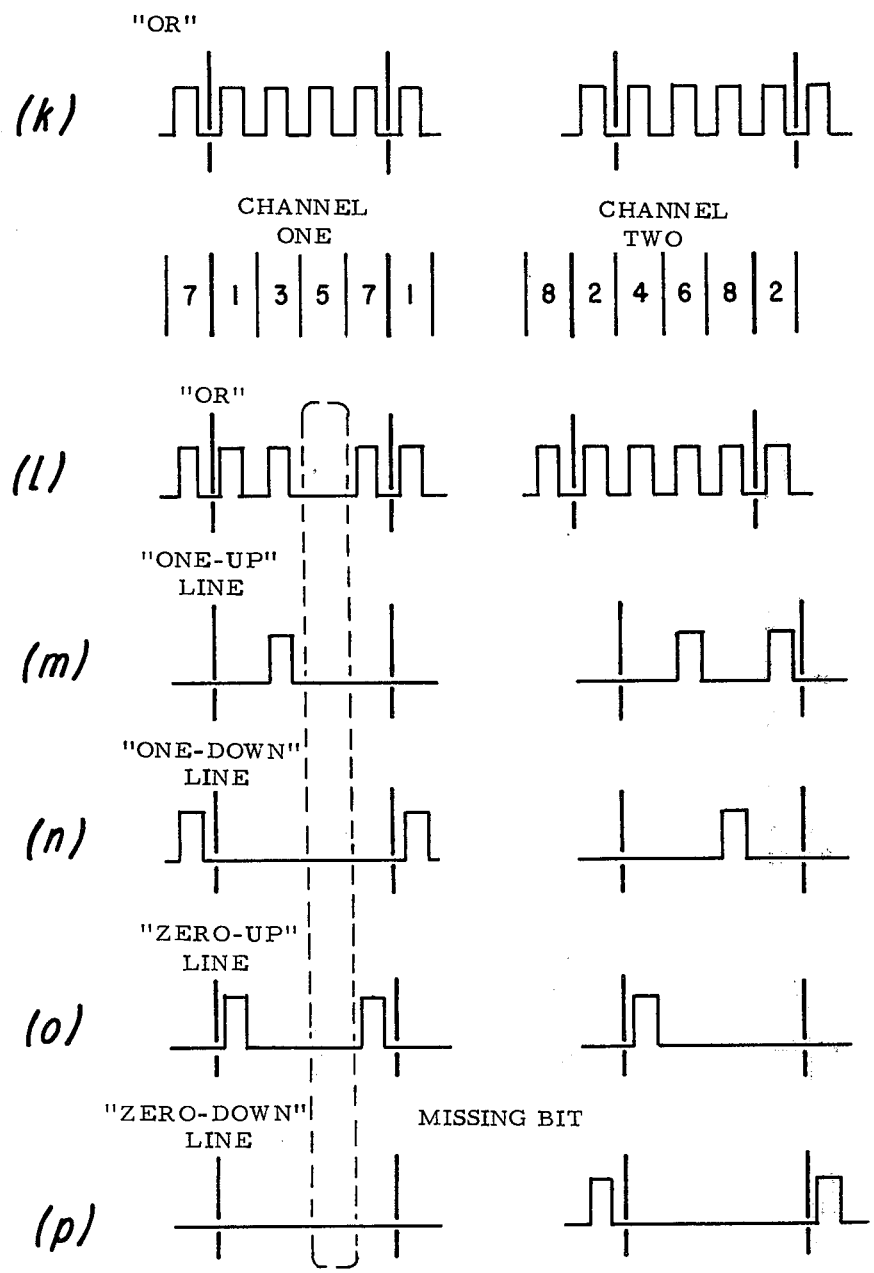
Fig. 4 (con't.)

ERROR CORRECTION SYSTEM IN A PROGRAMMABLE CALCULATOR

BACKGROUND OF THE INVENTION

This invention relates to apparatus for storing and retrieving digital data from recording medium and, more particularly, to a system within such apparatus for detecting and correcting errors.

User programmable digital calculators such as the programmable calculator described in copending U.S. Pat. application Ser. No. 622,280 filed of even date with and assigned to the assignee of the present invention utilize user recorded or prerecorded programs stored on a recording medium such as magnetic cards. It is desirable to provide an inexpensive and simplified system for detecting and correcting errors which occur in reading or writing data on such recording medium.

Such an error detecting and correcting system is provided in accordance with the present invention and may be incorporated on the data reader/writer chip associated with the recording mechanism of such programmable calculator.

In accordance with the present invention, data is stored and retrieved from a recording medium such as a magnetic recording medium utilizing a nonrecurring zero storage technique in which a first track is provided for alternately storing negative to positive and positive to negative transitions for each "zero" bit and a second track is provided for alternately storing negative to positive and positive to negative transitions for each "one" bit. In one embodiment of the invention, a plurality of such pairs of tracks are provided. The ORed output of at least two of the pairs are then compared to determine whether a bit has appeared on one pair but is missing from the other pair. For reading the data stored on the storage media, means such as a data latch is provided for each track for storing the direction of the previous transition positive to negative or negative to positive for that track and means for comparing the direction of such previous transition with the direction of the present transition. Whenever it is determined that the state of a bit of data is missing on a pair of tracks, i.e., no transition stored on either track for a given bit, the transitions preceding and following the missing transition will indicate the track on which the data bit should have been stored and hence the state of the missing bit. Correction means is then provided for generating the state of the missing bit and transferring it in place of the missing bit.

BRIEF DESCRIPTION OF THE DRAWINGS

Still further advantages of the invention will become apparent from the following detailed description and appended claims when read in conjunction with the accompanying drawings in which:

FIGS. 1a and 1b comprise a block diagram of a magnetic card reader/writer chip for a programmable calculator, embodying the system of the present invention;

DETAILED DESCRIPTION OF AN EMBODIMENT OF THE INVENTION

Figure 1A:
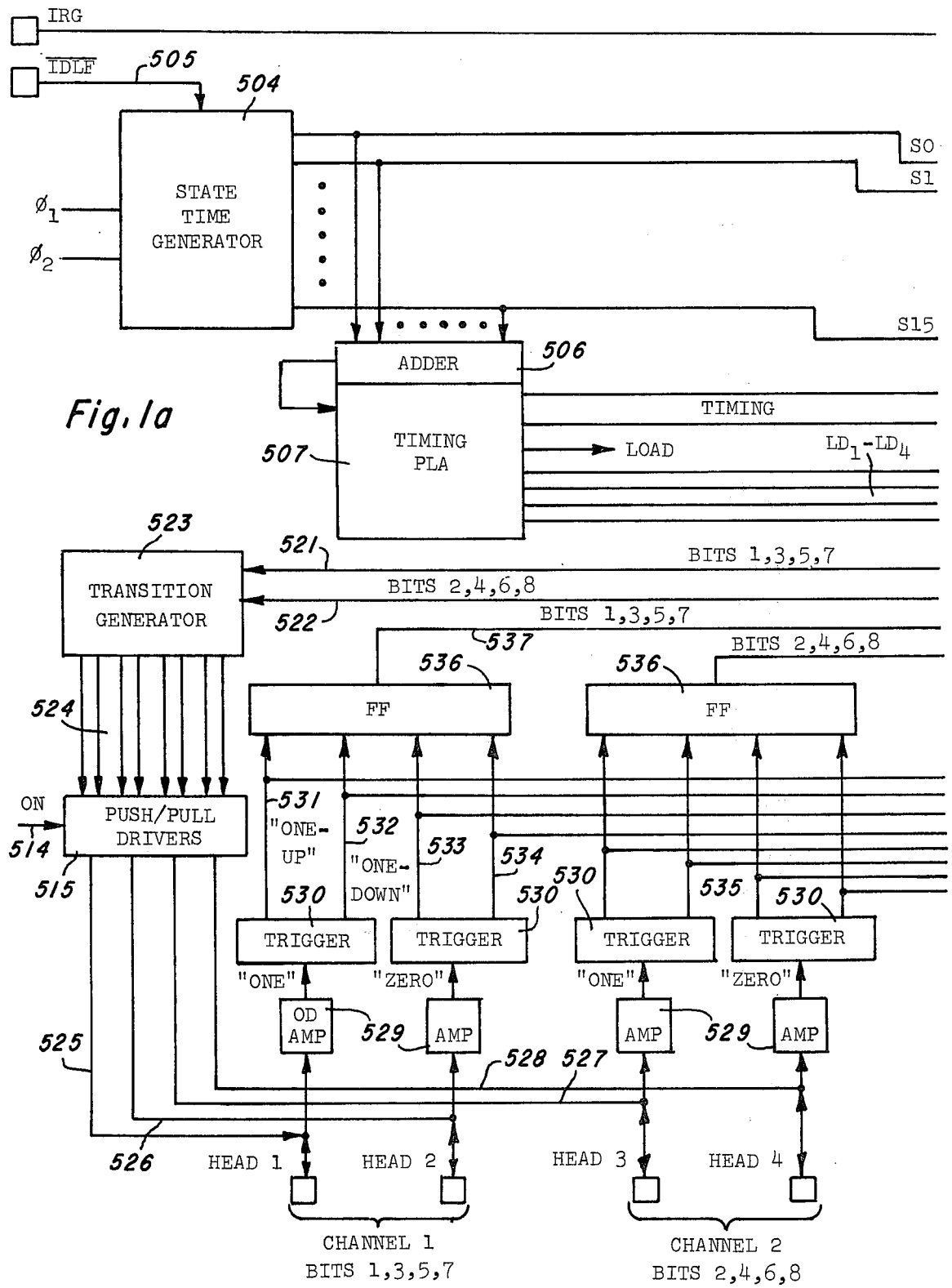

FIGS. 1a and 1b are functional block diagrams of a magnetic card reader/writer chip for a programmable calculator embodying the present invention. FIGS. 2a–2j and FIGS. 3a–3e are detailed logic diagrams of the same chip in which all of the logic gates, PLA's and other circuit elements are designated by standard contemporary symbology well known in the art. Not shown, but understood to be connected to the card reader/writer chip, is a two channel magnetic card reader/writer mechanism having a four track head for magnetically storing information on a card and retrieving information from such a card. This type of mechanism is well known in the art and will not be described in detail here. Furthermore, it is understood that the card reader/writer chip is coupled to a calculator system such as that described in Ser. No. 622,280 referenced above, and signals are transmitted between the reader/writer chip and the rest of the system. For example, the card reader/writer chip is connected to the calculator system by an EXT line and receives a timing sync signal IDLE and internal instruction words (IRG). The card reader/writer chip also produces a BUSY signal which is supplied to the calculator system to indicate that the chip is currently engaged in reading or writing and is not ready to accept (or provide) additional data.

Control of the card reader/writer chip is accomplished in the following manner. The calculator system's internal instruction word (IRG) is applied to instruction decode PLA 501 where it is decoded to produce control signals to control logic 502 and buffer logic 503. The state times for the chip are produced in the state time generator 504 and are synchronized with the calculator system by the application of the synching signal IDLE. The state generator 504 supplies sixteen state times, $S_0$–$S_{15}$, to instruction decode PLA 501 and adder 506 (which is associated with the timing PLA 507.) 502 produces control signals to input/output buffer logic 503 and to the card reading/writing mechanism (not shown).

In response to timing signals, control signals (from instruction decode PLA 501), and the card sense signal (SENS, supplied on line 508 by the magnetic card reading/writing mechanism), read/write control logic The SENS signal provided by the card handling mechanism on line 508 to control logic 502 indicates the status of the card reader/writer mechanism. This signal serves two functions. Initially it indicates the physical presence of a card; then the condition of the card, i.e., protected or unprotected. This input and those provided by instruction decode PLA 501 enable the control logic to produce control signals to external devices on lines 509–511 and to internal circuits on lines 512–514.

Line 509 supplies a voltage when needed to power the lamp in the reading mechanism which is used in conjunction with phototransistor over SENS line to determine (by an optical reading method, for example) whether a card is present in the mechanism. Similarly line 510 supplies power, as required, to the motor which propels the magnetic card past the read/write heads of the mechanism. As described above, the control logic produces a BUSY signal when unable to accept (or produce) data. In addition to these external signals, a number of control signals are produced which are inputs to various circuits within the card reader/writer chip. Two of these signals, $COND_1$ and HOLD, are applied on lines 512 and 513 to input/output buffer logic 503 to aid in controlling the transmission and reception of data (program step words) on the EXT line. The $COND_1$ signal on line 512 is produced by control logic 502 to indicate that the writing mechanism is disabled because the particular card currently in that mechanism is a "protected" card, i.e., is a card on which information has previously been permanently stored and which has been designated as "protected" so that no further information is written over that which is already stored. The HOLD signal on line 513 is supplied to buffer logic 503 in order to set the HOLD bit in EXT which instructs the calculator system to provide additional time, as has been previously described, for card reader/writer executions. The ON signal produced on line 514 is supplied to push/pull drivers 515 in order to turn on the buffers within the driver circuits when "writing" is to be performed.

Input/output buffer logic 503 provides control of the data flow (program step words) on the EXT line. In addition to the inputs from control logic 502, decoded instruction signals, EXTDR8 (EXT line to Data Register, 8 bits) and DREXT8 (Data Register to EXT line, 8 bits) are provided by instruction decode PLA 501.

The $COND_2$ signal on line 516, when set, indicates that the error detection and correction circuit 517 has detected two errors in sequence on a single track as it is being read from a magnetic card. In accordance with the present invention, as will be hereinafter described in detail, the error detection and correction circuit is capable of detecting and correcting an error in a sequence of data on any particular track. Where two or more errors are detected in sequence on one track, the particular circuit of the present embodiment which utilizes two tracks/channel is incapable of making a correction. When such error condition exists, the $COND_2$ signal on line 516 is set, causing buffer logic 503 to set the COND bit in the EXT data word. The system continues to operate until the entire card is read. The calculator system then tests the COND bit and, upon finding the COND bit set, causes an indication of the error condition to be displayed to the user of the calculator as, for example, by flashing the display on and off.

When the card reader/writer chip is in the "write card" mode, as determined by the calculator system's current internal instruction word (IRG), a sequence of program step words is being serially applied to the chip on the EXT line (from a keyboard register of the calculator's arithmetic chip. This sequence of program step words originates from program storage (via the keyboard register and EXT line). Controlled by buffer logic 503, the eight bits of a user program step instruction word are serially shifted onto an eight bit data register 518. Data register 518 has serial inputs and outputs as well as parallel inputs and outputs. In the "write card" mode, the contents of data register 518 are supplied, in parallel fashion, to multiplex PLA 519 on lines 520. With the input of timed sequential loading signals, $LD_1$–$LD_4$, bits 1, 3, 5, 7 and bits 2, 4, 6, 8 are output from multiplex PLA 519 on lines 521 and 522, respectively. The bits are shifted out of the multiplex PLA 519 one after another on lines 521 and 522 to transition generator 523.

The scheme used herein for storing information on a magnetic card is well known in the art and will only be briefly described here. Generally, an NRZ (non-returning to zero) code is used in which, for each channel, two tracks are provided. One of these tracks is used solely for storing "ones"; the other stores only "zeros." Two channels are shown in the present embodiment which allows more information to be written on a single magnetic card than would be the case with a single channel. For each of these channels of data bits, each "one" causes a flux transition (alternating negative to positive and positive to negative) to occur on the "one's" track and each "zero" causes a transition (alternating negative to positive and positive to negative) to occur on the "zero's" track. No flux change occurs on the "one" track for a "zero" bit, and no flux change occurs on the "zero" track for a "one" bit. The device within the card reader/writer chip which produces the proper signals for implementing this method of information storage is transition generator 523. Receiving bits 1, 3, 5, 7 (channel one) on line 521 and bits 2, 4, 6, 8 (channel two) on lines 522, transition generator 523 converts the two data streams (which are in standard binary form) into signals which implement in NRZ code. These signals, supplied on lines 524 to push/pull drivers 515, are used to selectively control the heads of the magnetic reading/writing mechanism. Push/pull drivers 515 are enabled only when the ON signal is present on line 514. As previously described, this signal is supplied by control logic 502 only when the reading/writing mechanism is ready to accept and store information on a magnetic card. Lines 525–528 from push-/pull drivers 515 drive the four tracks. Note that line 525 (connected to the driver examplarily labeled 701 in FIG. 2b) and line 526 are respectively the "one" and "zero" lines of channel one, supplying $head_1$ ("one" head) and $head_2$ ("zero" head). Lines 527 and 528 supply the "one" and "zero" heads of channel two which operates to store bit transitions simultaneously with channel one. Thus, at least one bit is written on one of the tracks of each channel during each period, which during the reading mode makes it readily apparent when a bit is missing in one of the channels as will hereinafter be described in detail.

Figure 4:
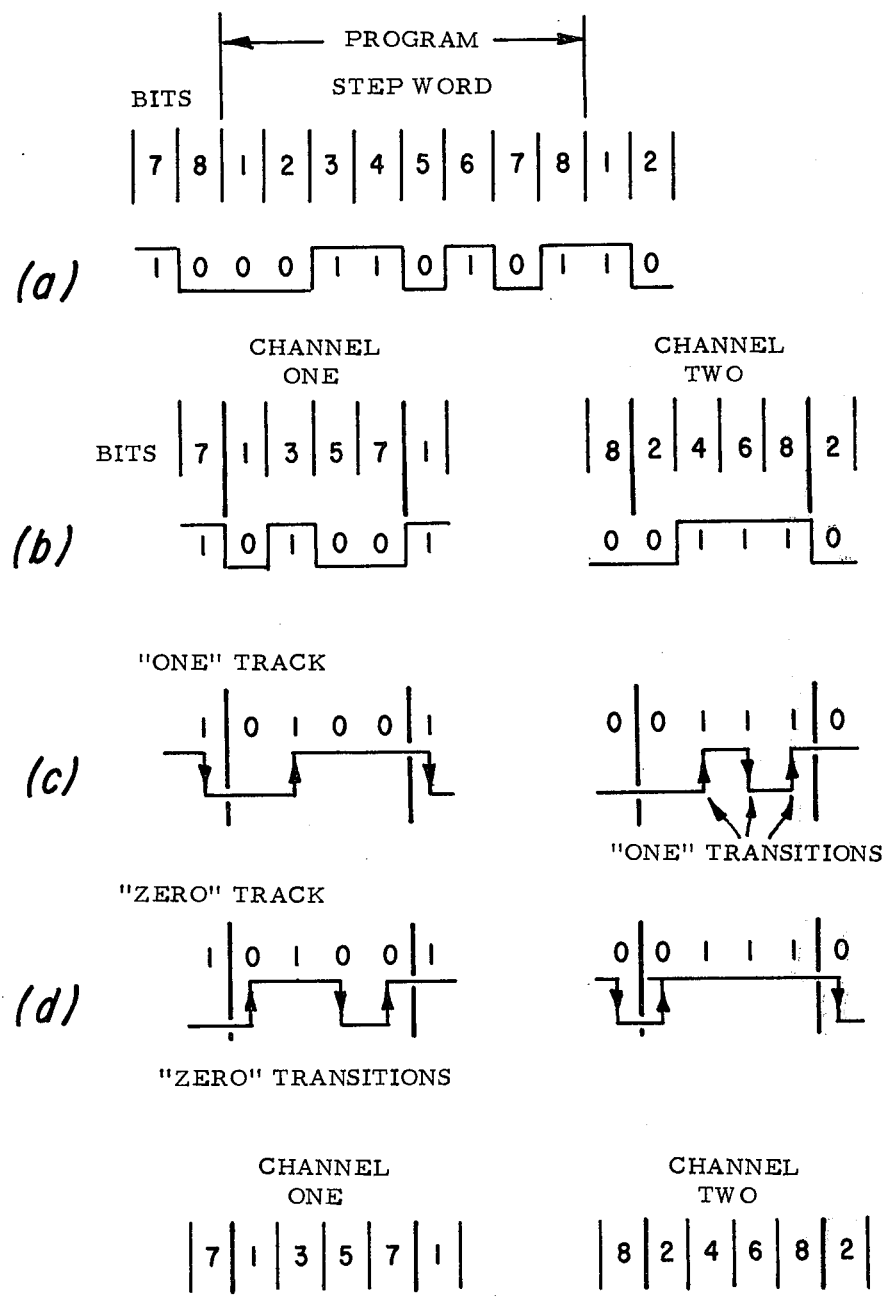
FIG. 4, comprised of diagrams (a)–(p), is illustrative of an example of reading and writing data utilizing the error detection and correction system embodied in the present invention.

As an example of the write operation, refer to the graphic representation of FIG. 4a, in which an examplary eight bit user program step instruction word is shown in binary form. As multiplexed by multiplex PLA 519, the four bit signals of each of channel one and channel two, corresponding to such exemplary user program step instruction word, are shown in FIG. 4b as they appear (in binary form) on lines 521 and 522. FIGS. 4c and 4d depict the corresponding "one" and "zero" flux transitions produced by the magnetic heads in response to transition signals provided by the transition generator 523.

Figures 2, 3:
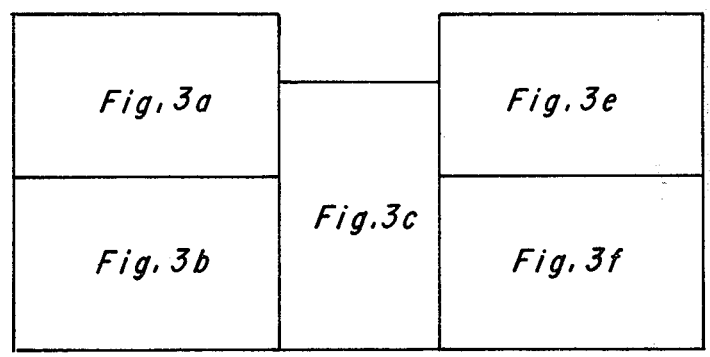
FIGS. 2a–2j, which are assembled according to the map of FIG. 2, and FIGS. 3a–3e, which are assembled according to the map of FIG. 3, comprise a detailed logic diagram of the card reader/writer chip of FIGS. 1.
Figure 2A:
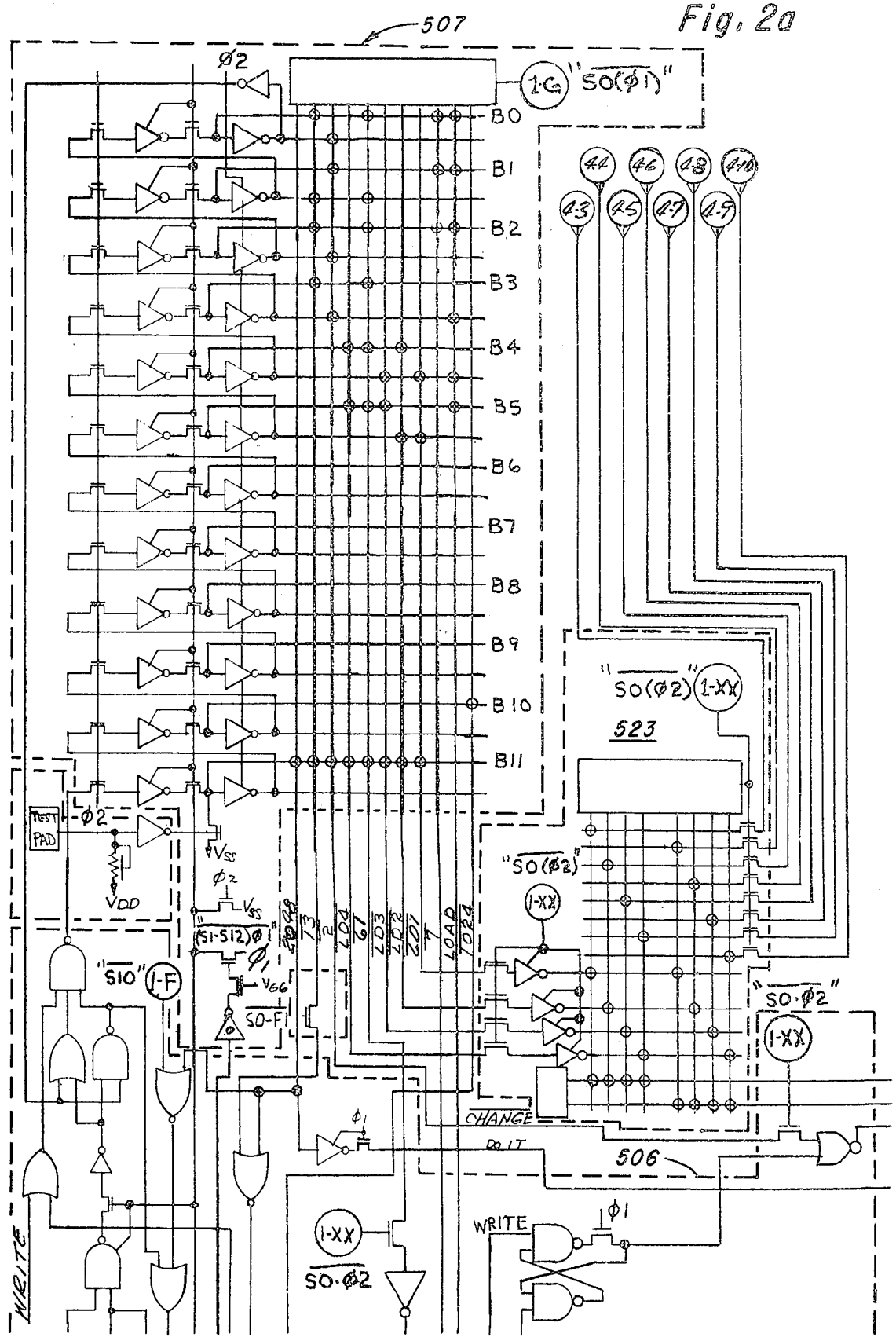
Figure 2B:
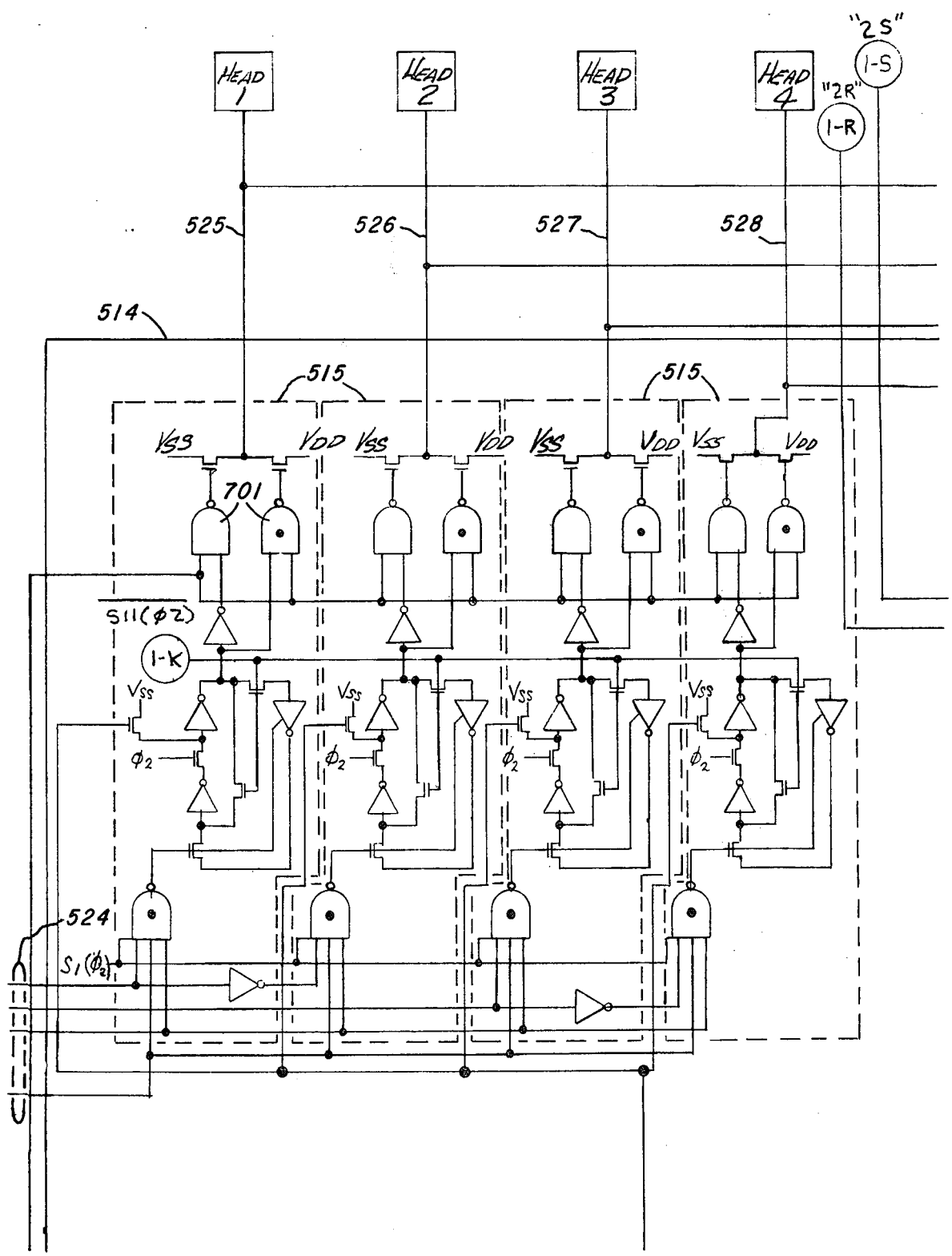
Figure 2C:
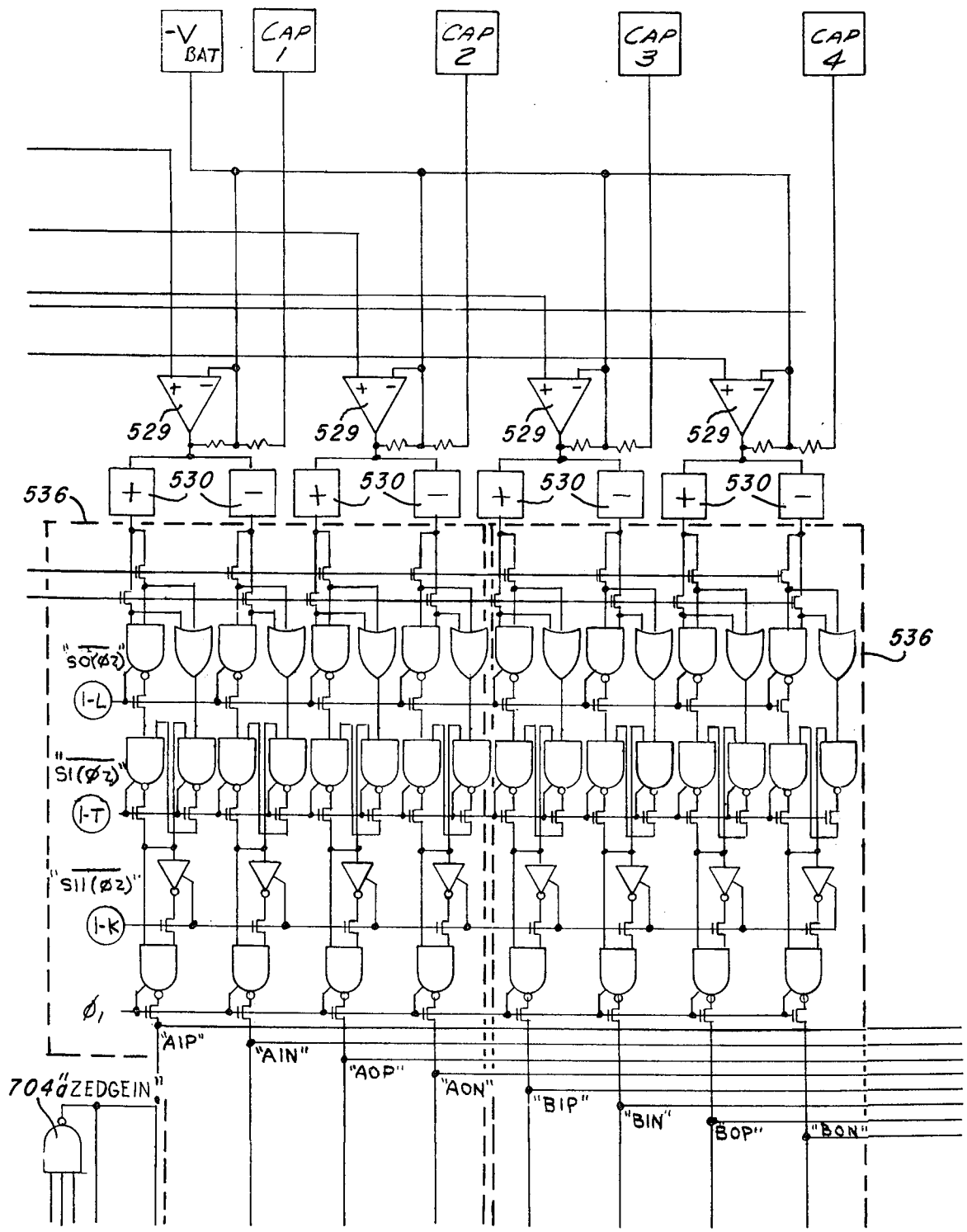

In FIGS. 1a and 1b and in FIGS. 2(2a–2j) and 3(3a–3e), the card reader/writer chip enters the "read card" mode upon command from the calculator system, as determined by decoding the calculator's internal instruction word (IRG). Of course, information stored on a prerecorded card which is to be read is stored in the NRZ code, and the mechanism which allows reading of the card uses the same four track magnetic head to read the two tracks of each of the two channels of the card. The lamp of the optical reading system and the motor used to propel the magnetic card are powered, as hereinabove described, by read/write control logic 502. A signal (SENS) indicating the presence of a card in the mechanism, is provided on line 508 to control logic 502. The proper signals to enable input/output buffer logic 502 are supplied from both the control logic 502 and the instruction decode PLA 501. In particular, DREXT8 (Data Register to EXT line, 8 bits) is applied to enable buffer logic 503 to output serially, on the EXT line, the contents of the data register 518. This signal, obtained by decoding the instruction word (IRG), indicates that the calculator system is ready to accept, on the EXT line, the user program step instruction words read from the magnetic card and transferred to the data register 518.

Output buffer 503 operates in conjunction with a tri-state buffer of the calculator system's arithmetic chip to enable the transmission of data along the EXT line from the card reader/writer chip to the system's keyboard register. The contents of the keyboard register (not shown) is continuously being circulated by shifting the contents through the tri-state buffer and back to the keyboard register. By lowering the impedance of output buffer 503 (lower than that of tri-state buffer on the arithmetic chip), the data being transmitted to the arithmetic chip on the EXT line may be written over the data being circulated in the keyboard register. This method of transmitting data is advantageous because it eliminates the need for synchronizing data transmission.

The stored information, on the magnetic card produces signals on lines 525 and 527 as the magnetic card moves. For example, the signals produced with the exemplary program step word of FIG. 4a is shown in FIG. 4e. The corresponding low level signals produced on lines 526 are 528 are shown in FIG. 4f. These low level signals, consisting of "up" negative to positive transitions and "down" positive to negative transitions, are amplified by four individual operational amplifiers 529 and, as amplified, are supplied to threshold detectors or Schmitt trigger devices 530. Threshold detectors 530 operate to pass a pulse of uniform magnitude when the predetermined threshold is reached and operate to filter noise from the card reader so as to prevent errors in the data. Threshold detectors 530 also serve to separate the "up" and "down" transitions so that, for example, line 531 carries a signal indicating only "up" transitions on the "one" track of channel one, as is shown in FIG. 4g. The signal on line 532 is responsive only to "down" transitions on the "one's" track of channel one as is shown in FIG. 4h. Similar signals are produced on lines 533 and 534 for the zero track of channel one. See FIGS. 4i and 4j. Channel two operates identically to channel one. The signals on lines 531–534, as well as the similar signals on lines 535 for channel two, are supplied to the error detection/correction circuit 517 and are applied to a respective one of two flip-flops 536, one flip-flop per channel. Each flip-flop is comprised of a data latch, e.g., data latch 702. At the outputs of these data latches, e.g., 703, the two channels of information which are being read from the magnetic card are converted to standard binary form with bits 1, 3, 5, 7 appearing sequentially on line 537 and bits 2, 4, 6, 8 appearing sequentially on line 538. These data bits on lines 537 and 538 are applied to the eight bit shift register 539 in the appropriate bit positions. When the shift register 539 is completely filled with all eight bits, an eight bit user program step instruction word has been read from the magnetic card and decoded.

As has been described above, the signals on lines 531–535 are also supplied to the error detection/correction circuit 517. The signals on lines 531–534 completely define the four bits of data on channel one. Correspondingly, lines 535 carry signals determining the four bits of data on channel two. Operation of the error detection/correction circuit 517 embodied in the present invention will be herein described only with respect to channel one since the circuit 517 operates identically on channel two.

With reference to FIGS. 4g–4j, it may be seen that, for a four bit data word on channel one, a total of four pulses are produced on lines 531–534. These pulses occur at different times such that if lines 531–534 were applied to the input of an "OR" gate 704 in FIG. 2h, the signal shown in FIG. 4k would appear at the output. A similar signal is produced for channel two when lines 535 are ORed by gate 704a. A comparison of the signals at the outputs of each of the OR gates associated with each channel will indicate a missing bit on either channel. For example, if the card reading mechanism should miss a flux transition stored on the magnetic card, one of the "one (zero) - up (down) transition" pulses shown in FIGS. 4g–4j would not be present on lines 531–534. When applied to the "OR" gate 704, the output for the one channel would be as shown in FIG. 4l while the other channel would indicate that a bit should be present in that position. When it is detected that a pulse is missing on one channel, the next pulse appearing on one of the four lines, e.g., 531–534, of that channel is examined. Thus, since there are two channels of data, each of which produces a clock type signal at the output of an "OR" gate (as is shown in FIG. 4l), advantage is taken of the redundancy in accordance with a feature of the invention in order to detect whether a pulse is missing in one of the channels. The error detection circuit examines individually each channel's clock type output, and a counter (which in this embodiment counts to seven) is started when a pulse is encountered on either channel at the output of that channel's above-mentioned "OR" gate which sets latch 705. If no pulse has been detected within a predetermined time (i.e., count of seven as indicated on counter output line 706) at the "OR" gate output for the other channel, the error detection circuit determines that there is a pulse missing and error latch 708 of error latch circuit 517 is set. The signal on line 706 causes the data from latch 702 on line 703 and latch 707 on line 720 to be latched into output shift register 539. If both latches are set then no pulse is missing.

Figure 2D:
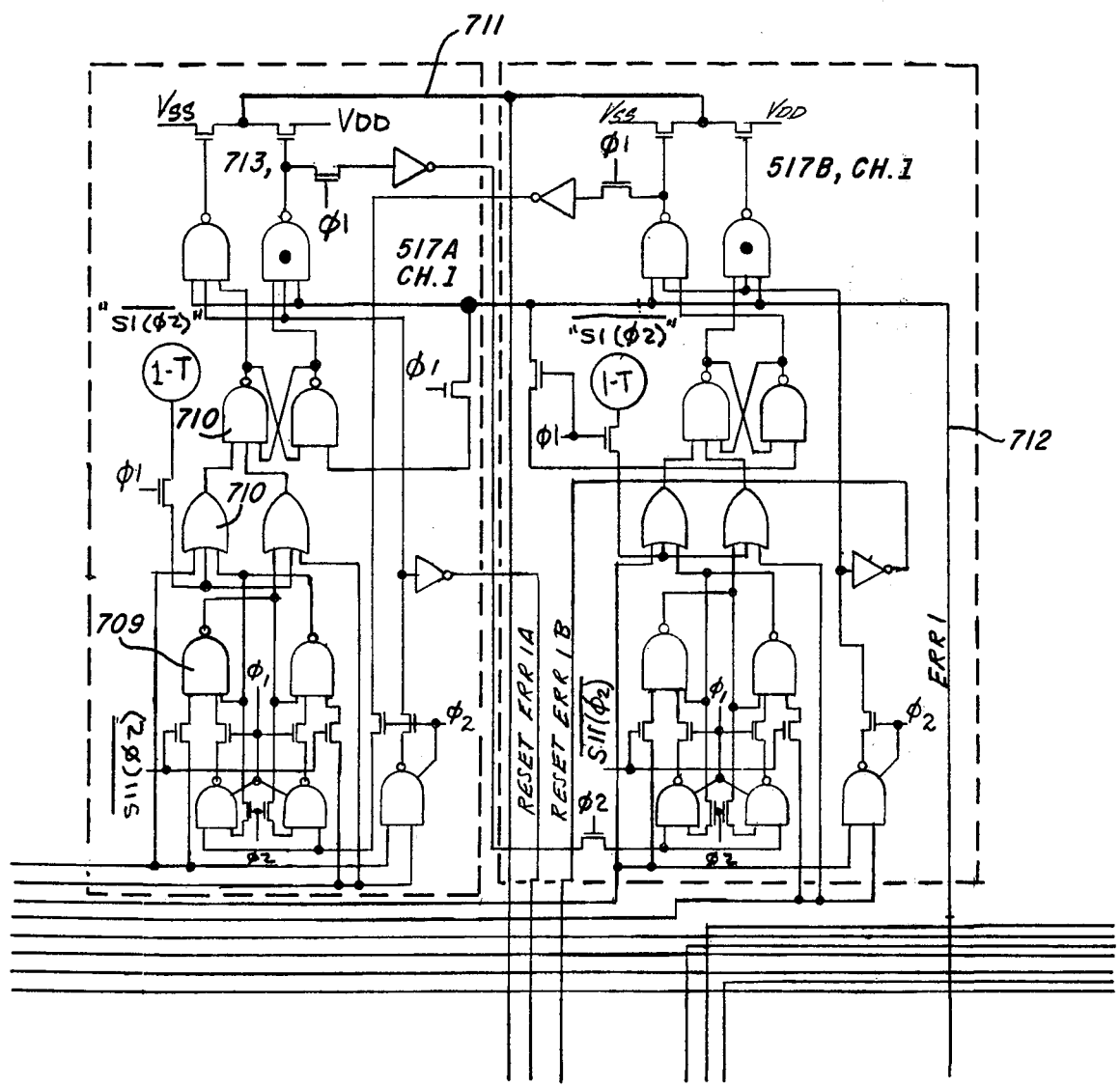
Figure 2E:
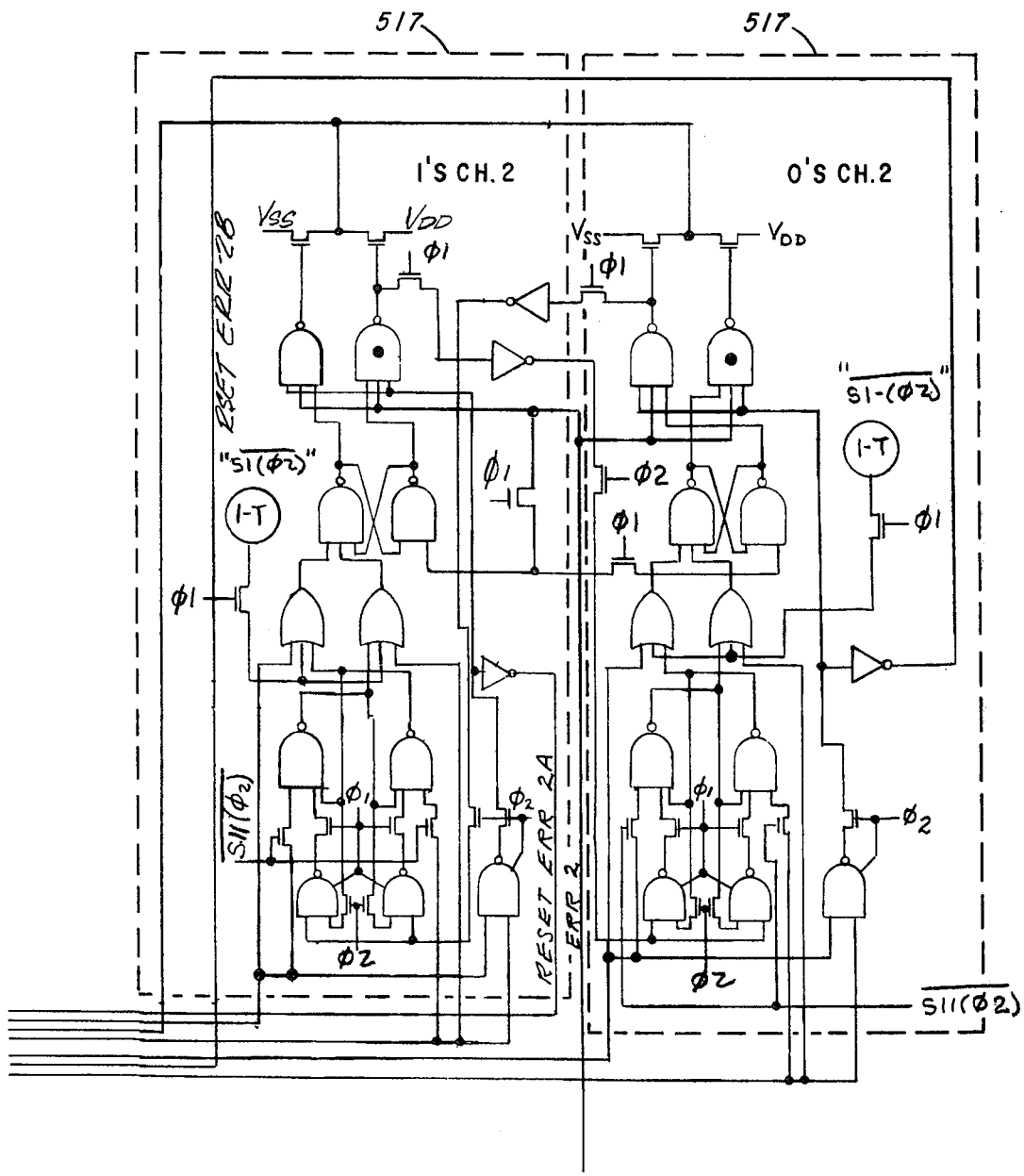
Figure 2G:
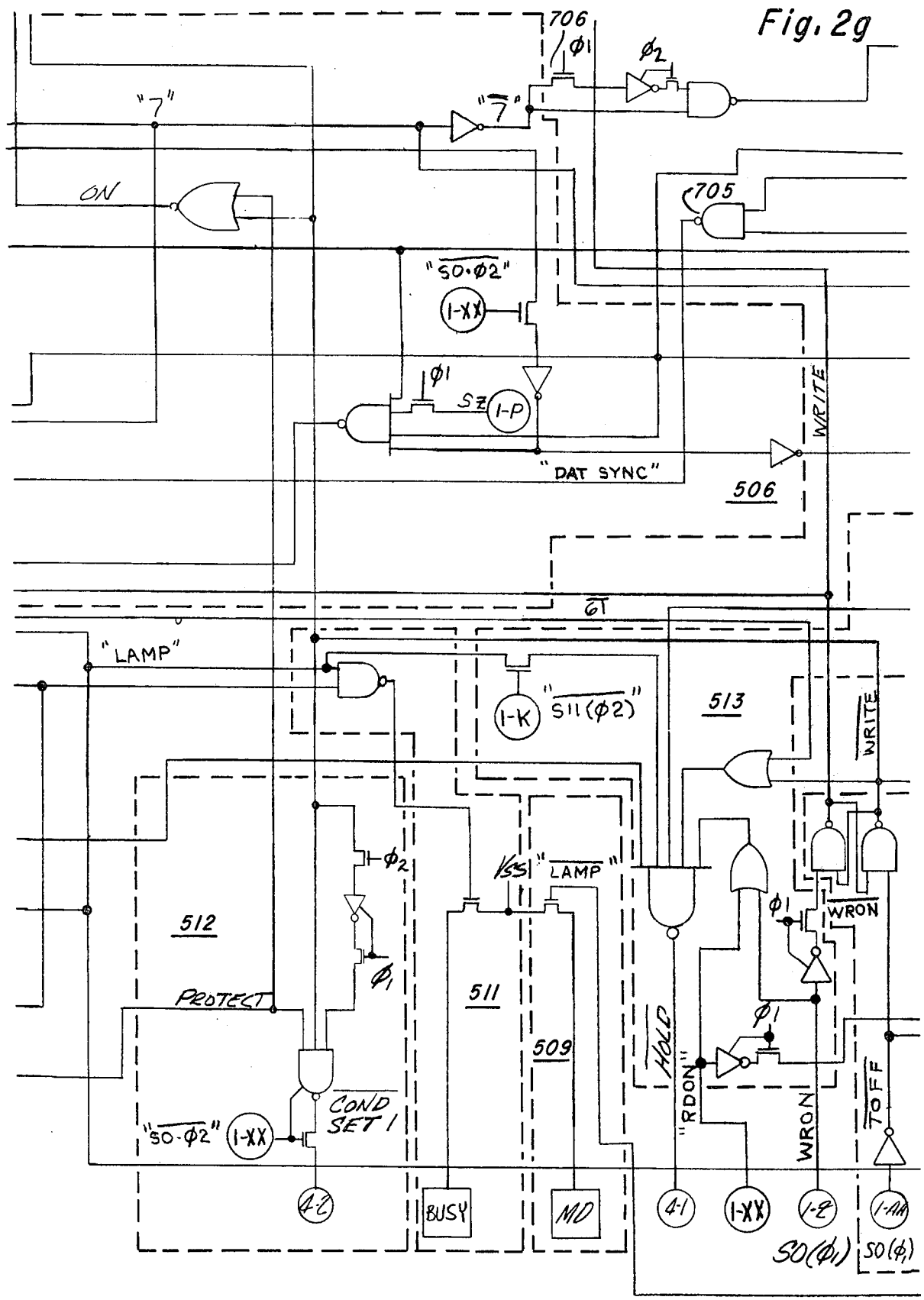
Figure 2H:
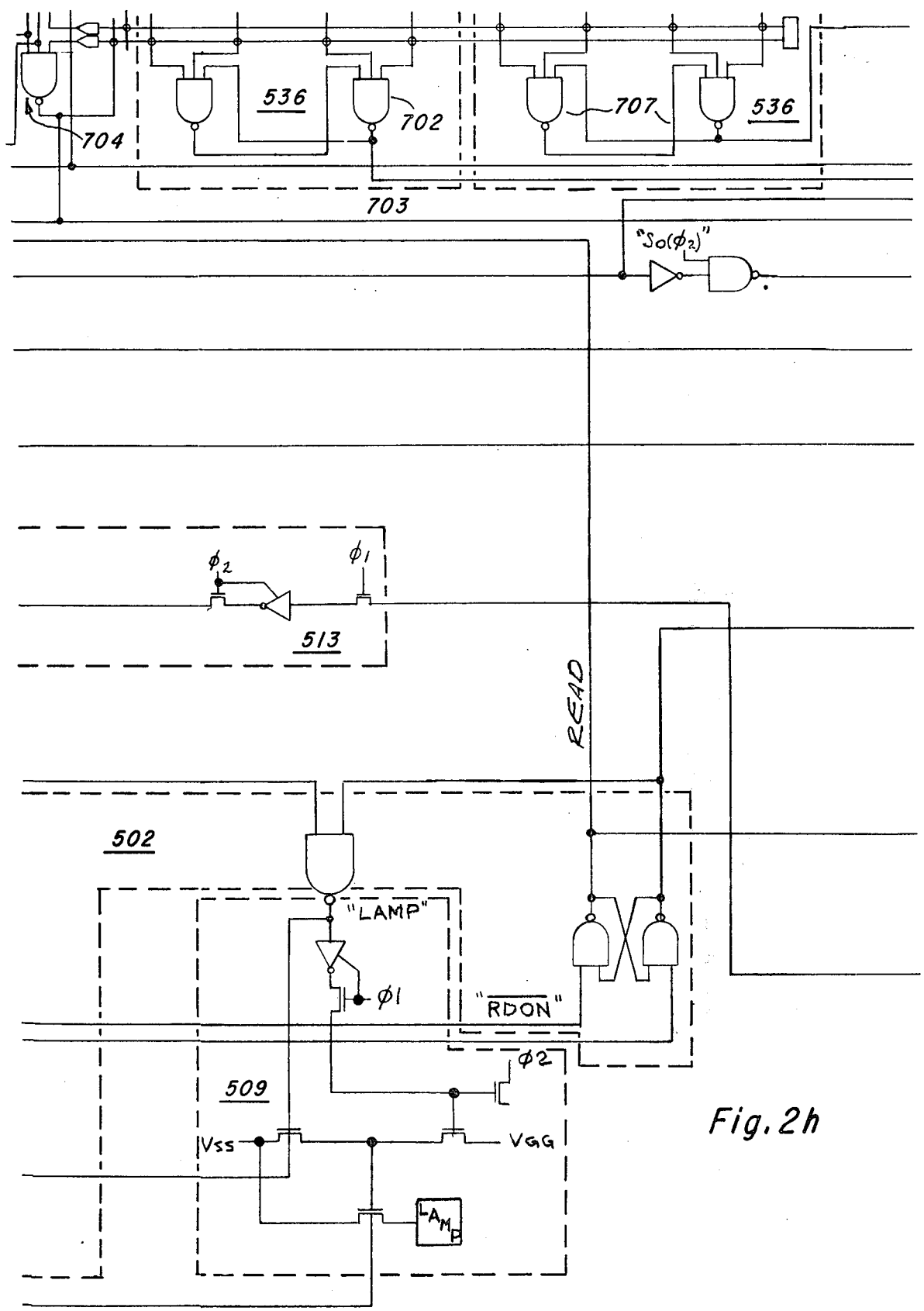
Figure 2I:
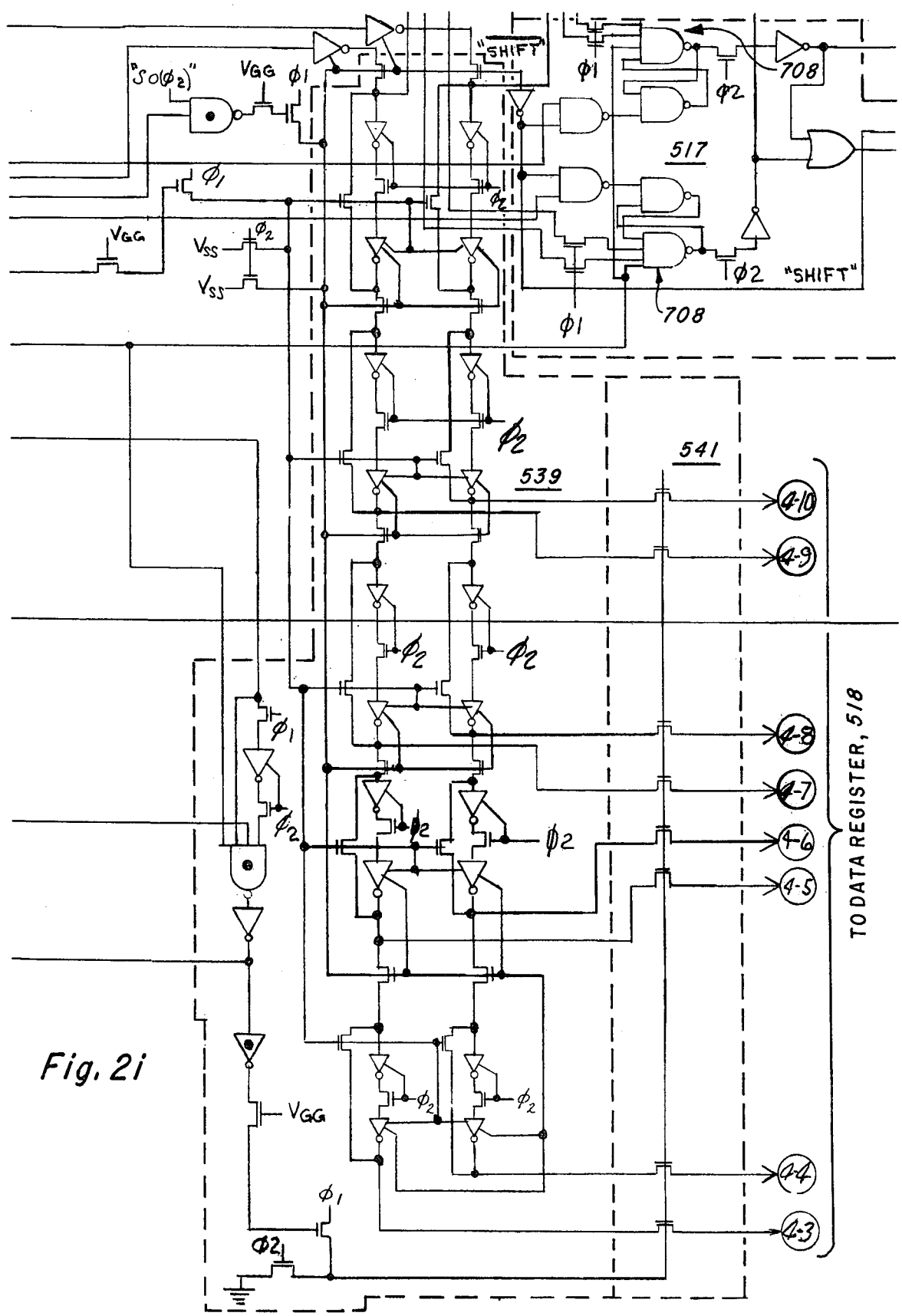
Figure 2J:
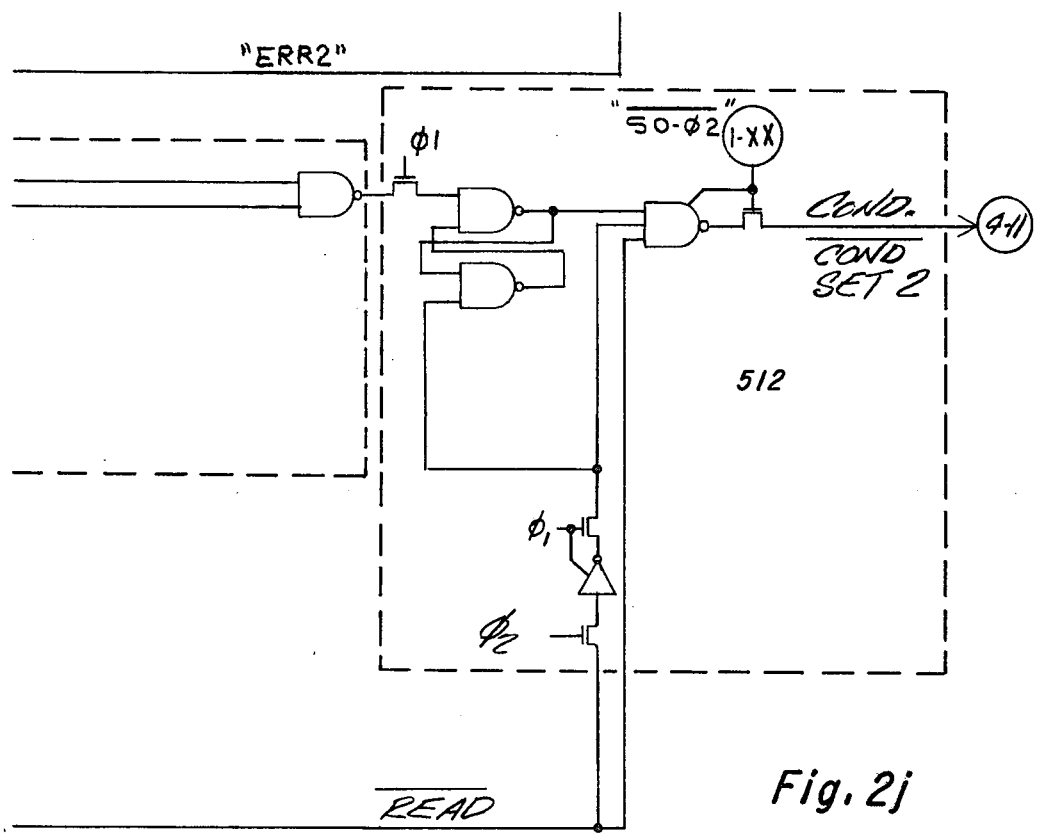
Figure 3A:
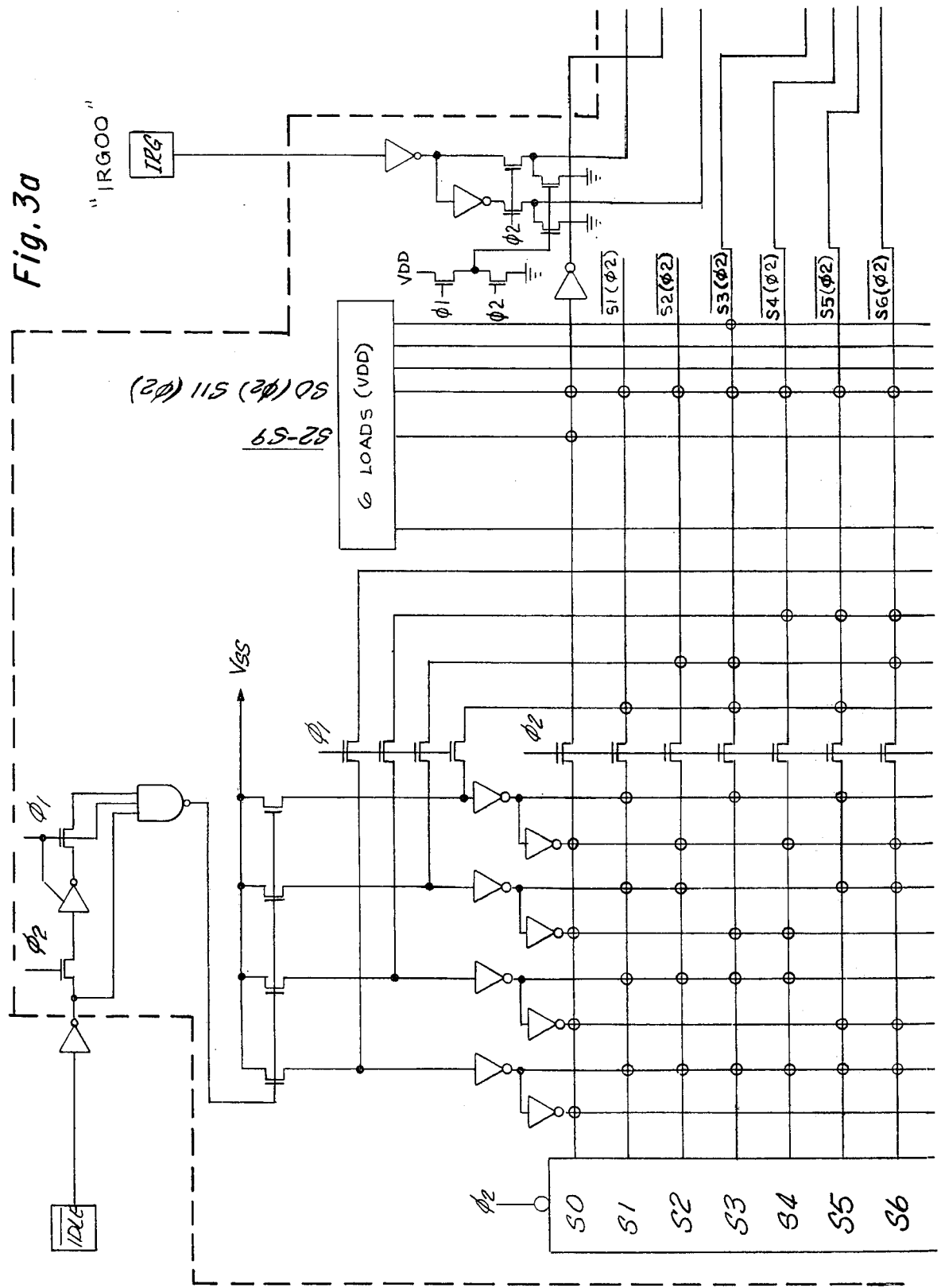
Figure 3B:
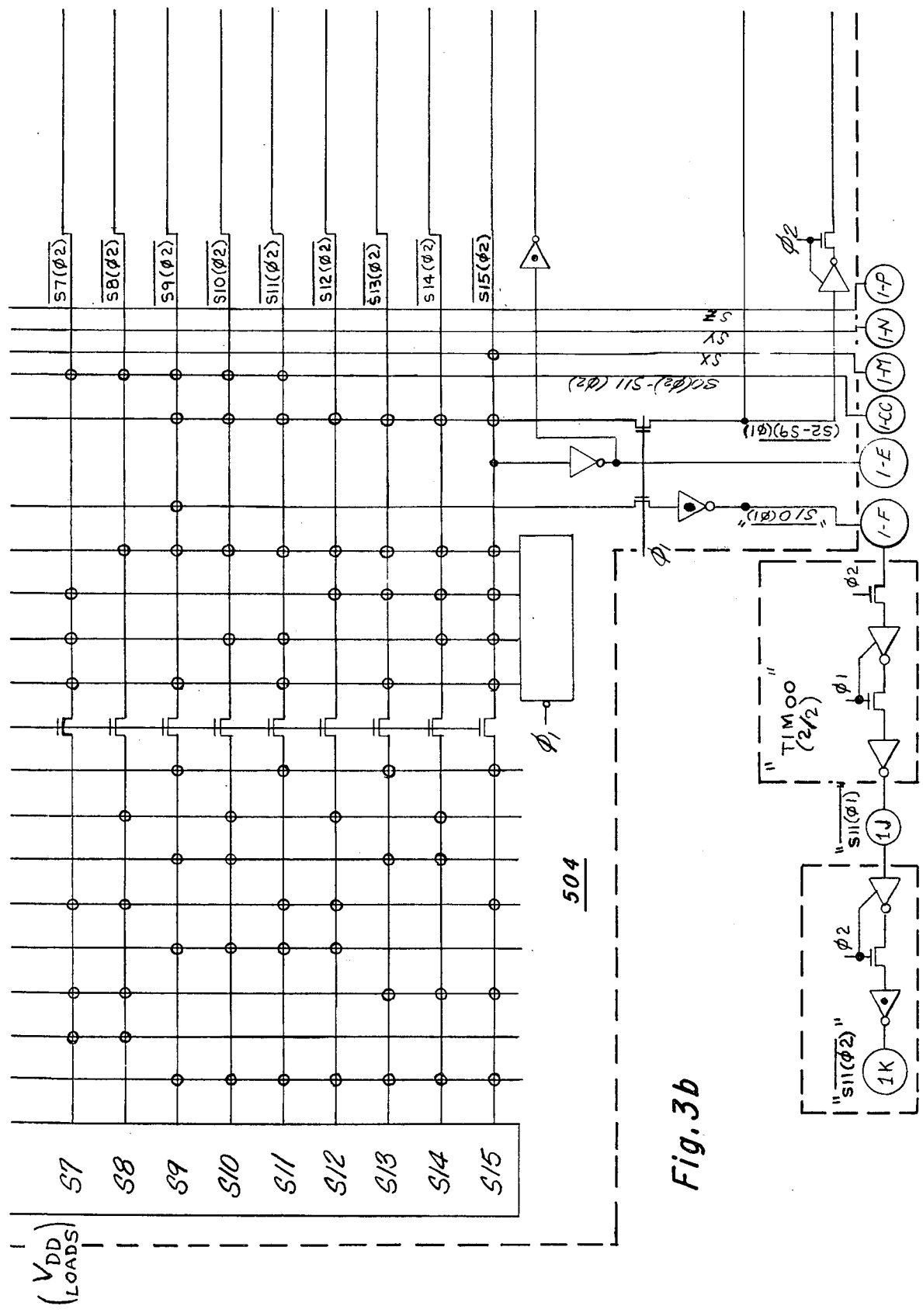
Figure 3C:
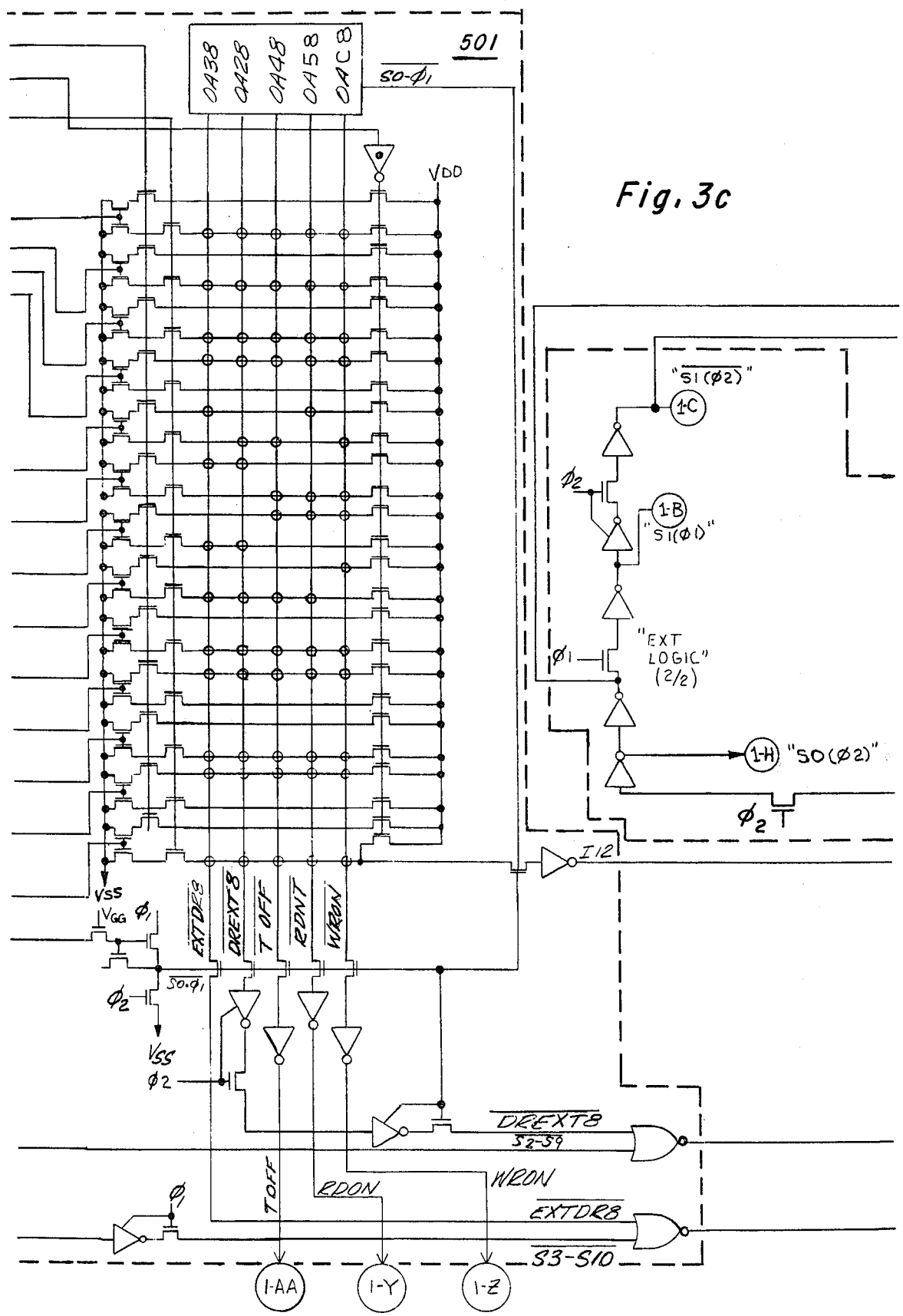
Figure 3D:
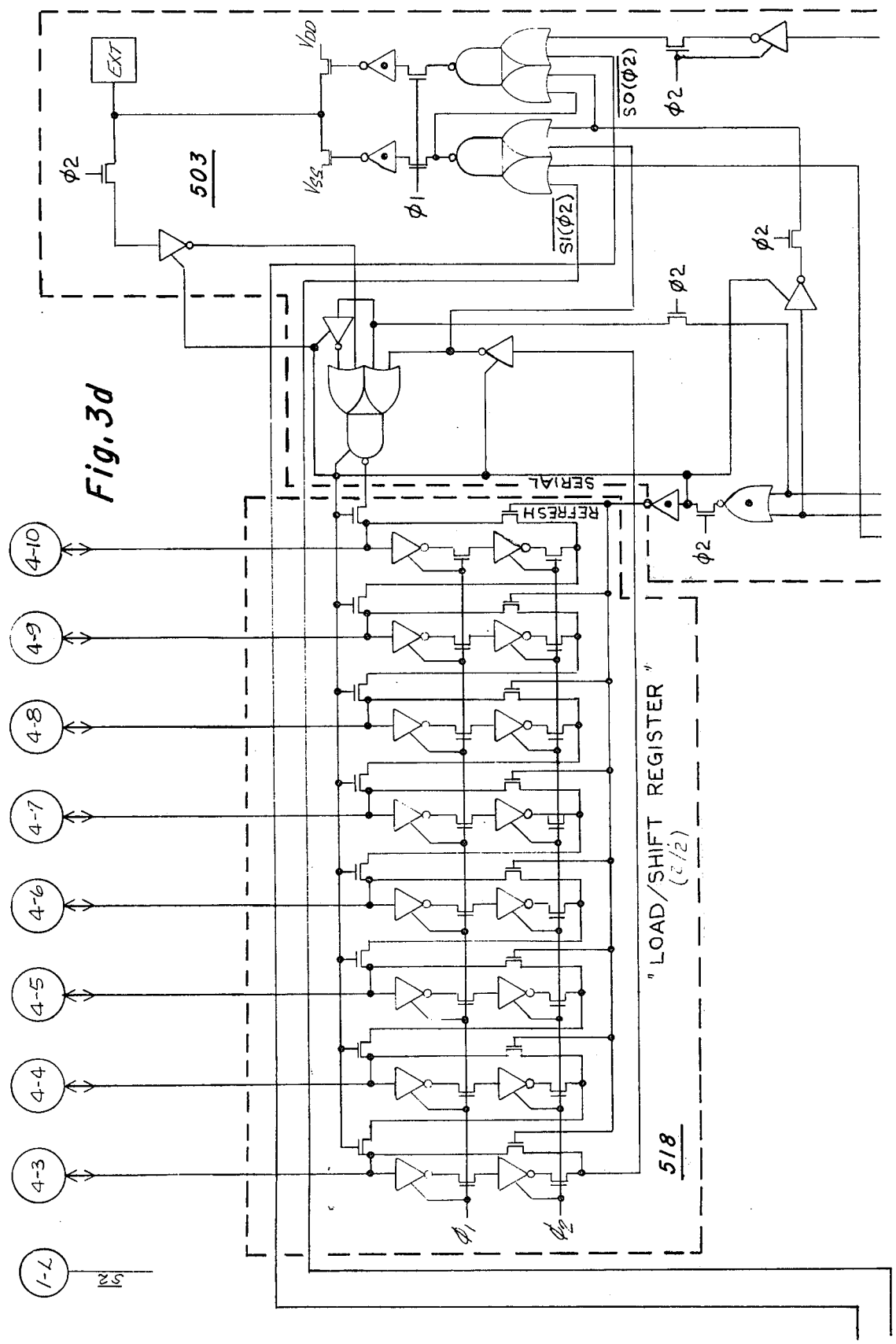
Figure 3E:
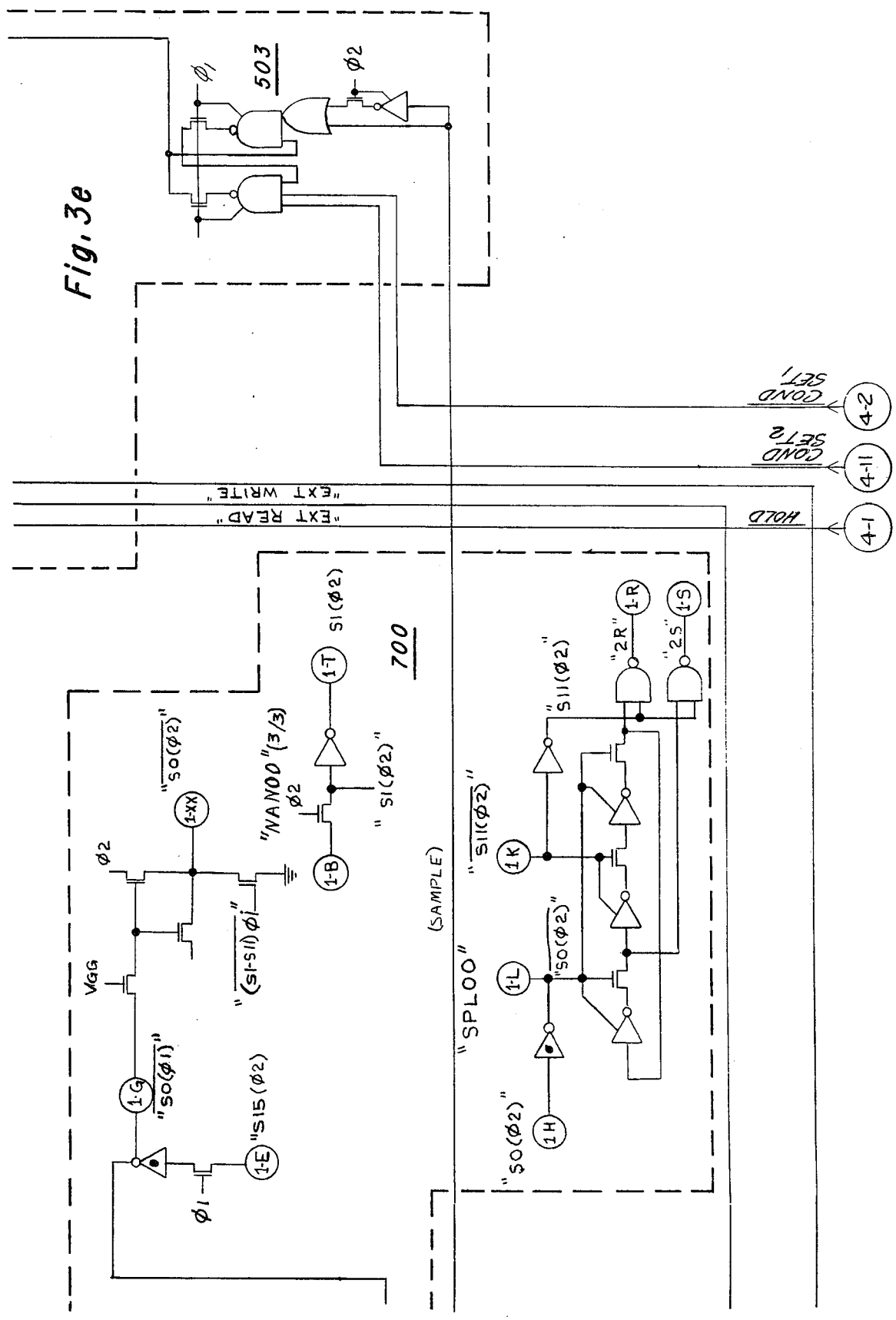

The principle upon which this error detection circuit of the present invention operates is that for each track there should be a "down" transition between two "up" transitions or, conversely, an "up" transition between two "down" transitions. If such is not the case, a reading error has occurred; the reading mechanism is misaligned or has missed a bit. With reference now to FIGS. 4l–4p, it can be seen that, for example, bit five (the third of four bits in channel one) has been lost. Examining each of the two pairs of lines ("one" track and "zero" track) during the next bit time, the circuit determines that the next pulse occurs on the "zero-up" line (line 533). By examining latches set by the immediately previous pulses on both lines 533 and 534 ("zero" track), it is detected that there has been no pulse on the "zero-down" line (line 534) since the last pulse on the "zero-up" line (line 533). Because the pulses on the "zero-up" line directly represent "up" transitions on the zero track, and the pulses on the "zero-down" line represent "down" transitions on the zero track, this indicates that there has been no "down" transition between two "up" transitions. This is an error condition as hereinabove stated. The error condition is seen to exist on the zero track, and more specifically, a "down" transition on bit five has been missed. See FIGS. 4j and 4p. When a bit has been missed on either channel and error latch 708 of error latch circuit 517 is set as indicated above the next bit of data is tested. If the next bit of data is detected on the same Schmitt trigger 530 of the pair for that track (i.e., the Schmitt triggers have not alternated from plus ("up" transition) to minus ("down" transition) or from minus to plus) — then there is an error on that track; if it alternates then the error is on the other track of that channel. The same is the case for the other channel. As illustrated in FIGS. 2d and 2e error correction circuit 517 includes latches 517a which examine the one's transition on channel one, 517b which examine the zero's transitions on channel one, 517c which examine the one's transition on channel two and 517d which examines the zero's transitions on channel two. For example, considering latches 517a, latch 709 retains the last value of the Schmitt trigger 530 which supplied the last one's polarity plus or minus over lines AIP or AIN, respectively. In latch 710, the previous polarity value from latch 709 is compared with the present value occurring on lines AIP and AIN. If the values are the same, then the error occurred on the one's track of channel one. Otherwise the error occurred on the zero's track of channel one and the missing bit can be supplied on line 711. Line 711 is coupled to data register 539 and resets the values of missing bits in that data register whenever the ERROR1 line 712 indicates that an error condition exists for such bits. The ERROR1 signal enables output drivers to 713 to drive line 711. Thus, if the value of latch 709 is the same as the new value on line AIP or AIN output 713 of the output driver goes to $V_{SS}$ because a one is missing. If it is not the same output 713 goes to $V_{DD}$ which corresponds to a missing zero. Thus logic 517a is used to correct an error on channel 1 when the bit immediately following the missing bit is a "one" transition (pulse on AIP or AIN). When the bit immediately following the missing bit is a "zero" transition (pulse on AOP or AON) logic 517b is used to correct the error by identical complementary means described above for logic 517a. In the examples of FIGS. 4j and 4p, error detection/correction circuit 517 pulls line 534 to $V_{DD}$ during bit five to correct the error. Bit five of eight bit holding shift register 539 is corrected, and the corrected program step word as read from channels one and two of the magnetic card may be transferred from shift register 539, to data register 518. Obviously if two bits are lost, no correction can be made according to this embodiment since it is not possible to detect which line has dropped a bit. In such a case, an indication of this condition is made by setting COND₂ from which a signal is applied on line 516 to input/output buffer logic 503.

The program step word (corrected, if necessary) is supplied in parallel on lines 540 through gates 541, which are activated by a LOAD signal from timing PLA 507. From data register 518, the program step word is serially transmitted on line 542 to buffer logic 503 and on to the keyboard register of the arithmetic chip (via the EXT line). Of course, once the user program step instruction word has been stored in the keyboard register, it may be stored in sequence in other data registers of the calculator system, or it may be immediately used to command operation of the calculator system.

Although a specific embodiment of the invention has now been described in detail, it is obvious that many changes and modifications can be made in the above details without departing from the nature and spirit of the invention. Therefore, it is understood that the invention is not to be limited to said details except as set forth in the appended claims.

What is claimed is:

1. In a system for reading binary data from a recorded storage media wherein said binary data is stored on a pair of tracks of said storage media with transitions of alternating polarity being stored on a first of said tracks indicative of a first binary state and transitions of alternating polarity being stored on the second of said tracks indicative of a second binary state, an error correction system comprising:
   a. signal receiving means for separately receiving the polarities of the transitions recorded on said first and second tracks;
   b. first means coupled to said signal receiving means for generating a binary bit for each recorded transition, the state of said bit being set to said first binary state for each transition received from said first track and to said second binary state for each transition received from said second track;
   c. second means coupled to said signal receiving means for determining each time a transition is missing from both said first and second tracks;
   d. storage means for storing the polarity of each transition immediately preceding a contemporarily received transition on said first track;
   e. comparison means coupled to said signal receiving means and to said storage means for comparing the contemporarily received transition on said first track with the polarity of the immediately preceding transition stored in said storage means; and
   f. third means coupled to said comparison means and to said second means for generating a binary bit of said first binary state for each missing transition whenever it is determined by said comparison means that the polarity of said contemporary transition of said first track is the same as the polarity of said immediately preceding transition of said first track.

2. The system according to claim 1 including:
   a. second storage means for storing the polarity of each transition immediately preceding a contemporarily received transition on said second track;
   b. second comparison means coupled to said signal receiving means and to said second storage means for comparing the contemporarily received transition on said second track with the polarity of the immediately preceding transition stored on said second storage means; and
   c. fourth means coupled to said second comparison means and to said second means for generating a binary bit of said second binary state for each missing transition whenever it is determined by said second comparison means that the polarity of said contemporary transition of said second track is the same as the polarity of said immediately preceding transition of said first track.

3. The system according to claim 2 including register means coupled to said first, third and fourth means for selectively storing the states of the binary bits as generated by said first, third and fourth means.

4. The system according to claim 1 wherein said second means is comprised of:
 a. logic gate means for generating the logical OR of a signal indicative of the presence of each transition on said first track and a signal indicative of the presence of each transition on said second track; and
 b. means coupled to said logic gate means for comparing said logical OR to a reference signal.

5. The system according to claim 4 wherein other binary data is stored in parallel on a second pair of tracks of said storage media in the same manner as said first pair of tracks and wherein said system includes second logic gate means for logically ORing a signal indicative of the presence of a transition on the first track of said second pair and a signal indicative of the presence of a transition on the second track of said second pair to produce said reference signal.

6. The system according to claim 5 wherein a transition is determined to be missing whenever the outputs of said first and second logic gate means do not match.

7. The system according to claim 1 wherein said recorded storage medium is a magnetically recorded medium.

8. The system according to claim 7 wherein said recorded storage medium is a magnetically recorded card.

9. The system according to claim 1 including register means coupled to said first and third means for selectively storing the state of the binary bits as generated by said first and third means.

10. In a system for reading binary data from a recorded storage media wherein the binary data is stored on a plurality of pairs of tracks of said storage media with transitions of alternating polarity being stored on a first track of each pair indicative of bits of data of a first binary state and transitions of alternating polarity being stored on a second track of each pair indicative of bits of data of a second binary state, an error correction system comprising:
 a. signal receiving means for separately receiving the polarities of the transitions recorded on each of said tracks;
 b. first means coupled to said signal receiving means for generating in parallel a binary bit for each pair of tracks, the state of each of said bits being set to said first binary state for each transition received from the first track of the respective pair and to said second binary state for each transition received from the second track of the respective pair;
 c. second means coupled to said first receiving means for determining each time a transition is missing from both tracks of any of said pairs of tracks, said second means including logic gate means for generating a signal equivalent to the logical OR of a signal indicative of the presence of each transition on the first track and a signal indicative of the presence of each transition on the second track of each of said pairs and means for comparing the logical OR signals to determine if a transition is present on one of said pairs but missing from another of said pairs;
 d. a storage device for each of said tracks, each storage device for storing the polarity of each transition stored on the respective track immediately preceding the last received transition from the respective track;
 e. a comparison means for each pair of tracks selectively coupled to said signal receiving means and to the respective storage device of the pair, each comparison means for respectively comparing the polarity of the last received transition of the pair with the polarity of the immediately preceding transition as stored in said respective storage device; and
 f. a generating means for each pair, each bit generating means coupled to said second means and to the respective comparison means of the pair for generating a binary bit of said first binary state for each transition determined missing from the pair whenever it is determined by the respective comparison means that the polarity of the last transition of the first track of the respective pair is the same as the polarity of the immediately preceding transition of the first track of the respective pair and for generating a binary bit of said second binary state for the missing transition whenever it is determined by the respective comparison means that the polarity of the last transition of the second track of the respective pair is the same as the polarity of the immediately preceding transition of the second track of the respective pair.

* * * * *